Patented Oct. 5, 1948

2,450,416

UNITED STATES PATENT OFFICE 2,450,416

PROCESS FOR POLYMERIZING BUTADIENE IN AQUEOUS EMULSION IN THE PRESENCE OF AN ALKALI METAL SALT OF HYDROXYTETRAHYDROABIETIC ACID

Joseph N. Borglin, Wilmington, Del., assignor to Hercules Powder Company, Wilmington, Del., a corporation of Delaware No Drawing. Application June 17, 1944, Serial No. 540,888

7 Claims. (Cl. 260—27)

This invention relates to an improved process for the emulsion polymerization of unsaturated compounds and, more particularly, to an improved process of polymerizing vinyl hydrocarbons to provide synthetic rubber-like materials.

It is well known that unsaturated compounds, particularly those containing the vinyl group, may be advantageously polymerized in aqueous emulsion. Synthetic rubber-like materials have been prepared by polymerizing in aqueous emulsion, butadiene hydrocarbons and compounds containing a vinyl group such as styrene, acrylic acid esters, acrylic acid nitrile, and the corresponding methacrylic acid derivatives. Polymers such as polyvinyl chloride, polyvinyl acetate, polystyrene, polymethyl methacrylate and various other addition polymers also have been prepared by polymerization in aqueous emulsion. Soaps of fatty acids are the most commonly used emulsifying agents for polymerizations of this type.

Fatty acid soaps, although effective emulsifying agents for the polymerization of vinyl compounds, are not sufficiently water-soluble and are, therefore, quite difficult to remove from the polymerization products. The presence of fatty acid soaps in the polymer has many disadvantages. Their presence in transparent plastic materials causes cloudiness. In the case of rubber-like polymers, the fatty acid soap remaining in the polymer is converted to free fatty acid, when acid is added, as is commonly done, in the precipitation of the polymer. Fatty acids soften and weaken the rubber and must, therefore, be removed from it. Their complete removal is very difficult.

Now in accordance with this invention, it has been found that the alkali metal salts of hydroxytetrahydroabietic acid may be used as emulsifying agents with very advantageous effects for the polymerization of vinyl compounds which are capable of being polymerized in aqueous emulsion by a peroxide-type catalyst, the polymer resulting from this process having superior tensile strength, tack and other processing characteristics.

The alkali metal salts of hydroxytetrahydroabietic acid have been found to be excellent emulsifying agents in the preparation of polymers by emulsion polymerization. They also have the advantage of being readily washed out of the polymer and, as a result, transparent plastic polymers prepared by this means are free from cloudiness. Furthermore, the presence of hydroxytetrahydroabietic acid or its lactone has been found to materially increase the tack in rubbery polymers, such as the copolymer of butadiene and styrene. The physical properties after cure of these polymers are also improved.

The following examples are illustrative of the preparation of polymers by emulsion polymerization and the products thereof in accordance with this invention. All parts given in the examples represent parts by weight.

Example I

To 400 parts of a 2½% aqueous solution of sodium hydroxytetrahydroabietate containing a 200% excess of sodium hydroxide solution, 6 parts of potassium persulfate, 45 parts of styrene, 136 parts of butadiene, and 1.6 parts of isoamyl alcohol were added. The mixture was agitated at 50° C. for 16 hours in a sealed container. A 65% yield of polymer was obtained by precipitation with a concentrated salt solution.

In order to compare the use of a hydroxytetrahydroabietic acid soap with that of ordinary rosin soap, the following control was run: To 400 parts of a 2½% aqueous solution of rosin soap, prepared from N wood rosin and containing a 200% excess of sodium hydroxide, 6 parts of potassium persulfate, 1.6 parts of isoamyl alcohol, 45 parts of styrene and 120 parts of butadiene were added. On carrying out the polymerization as described in the above example, a 23% yield of polymer was obtained. From these results it may be seen that the use of an alkali metal salt of hydroxytetrahydroabietic acid results in a greatly increased yield of polymer over that obtained by the use of a rosin soap.

Example II

This example was carried out exactly as described in Example I using sodium hydroxytetrahydroabietate except that 136 parts of isoprene were substituted for the butadiene used in that example. A 56% yield of polymer was obtained.

Example III

Ten parts of hydroxytetrahydroabietic acid in 400 parts of water were neutralized with sodium hydroxide and 0.6 part of potassium persulfate, 1 part of lauryl mercaptan, 50 parts of styrene and 150 parts of butadiene were added. The mixture was agitated at 50° C. for 14 hours in a sealed container. The emulsion was then run into an open vessel containing 20 parts of a 2% solution of phenyl-beta-naphthylamine, stripped of the excess butadiene and the polymer precipitated by the addition of an excess of a saturated salt solution. The precipitated polymer was washed with water, until alkali free, then with alcohol and finally was dried to constant weight on a mill. A 70% yield of polymer was obtained.

Example IV

Ten parts of hydroxytetrahydroabietic acid in 400 parts of water were neutralized with sodium hydroxide and 5.5 parts of tertiary-butyl hydroperoxide solution (60% peroxide), 150 parts of butadiene, and 50 parts of acrylonitrile were added. The mixture was agitated at 50° C. for 14 hours in a sealed container. The polymer was precipitated, washed, and dried as described in Example III. A 70% yield of butadiene-acrylonitrile polymer was obtained.

Example V

Ten parts of hydroxytetrahydroabietic acid in 400 parts of water were neutralized with sodium hydroxide and 200 parts of styrene containing 0.2 part of benzoyl peroxide were added. The mixture was agitated at 50° C. for 16 hours in a sealed container. The polymer was precipitated, washed with water and alcohol and then dried to constant weight in a vacuum oven at 60° C. The yield of polystyrene was 85%.

The hydroxytetrahydroabietic acid soaps described in accordance with this invention may be prepared by neutralization of hydroxytetrahydroabietic acid with an alkali metal compound, basic in nature. Alkali metal compounds suitable for this purpose are the hydroxides, carbonates, etc., of sodium, potassium, etc. The soap may be prepared in situ; i. e., the hydroxytetrahydroabietic acid may be added to the monomeric material and a solution of alkali added, or the soap may be incorporated in the polymerization mass in the form of a paste or in the form of a dry soap.

The hydroxytetrahydroabietic acid soaps may also be prepared by saponification of the lactone of hydroxytetrahydroabietic acid. A convenient method for preparing this lactone is described in U. S. 2,225,246. This method involves the treatment of a dihydroabietic acid with concentrated sulfuric acid under conditions which promote sulfonation at a temperature range of about −5° C. to about 50° C., treating the resultant product to remove sulfonation products and other water-soluble bodies therefrom, and leaving an insoluble residue, treating this insoluble residue with aqueous caustic alkali to produce a second insoluble residue which is the crude lactone of hydroxytetrahydroabietic acid. This may or may not be further purified for use in the present invention.

While fatty acid soaps are the most commonly used soaps for emulsion polymerization reactions, they have many disadvantages as noted above. Ordinary rosin soaps, on the other hand, are not practical emulsifying agents for these reactions since they result in a low yield of polymer. Hydroxytetrahydroabietic soaps contain no inhibitors or retarders and the yield of polymer obtained is high at a satisfactory rate or comparable to that of fatty acid soaps. These facts are clearly illustrated by the foregoing examples. In addition to this advantage, the polymer formed is consistently more uniform in its tensile properties than when fatty acid soaps are used as the emulsifying agent.

In contrast to fatty acids which weaken synthetic rubbers, hydroxytetrahydroabietic acid has been found to produce beneficial effects on these rubbers. The tensile strength, elongation, tack and other physical properties are improved by the presence of hydroxytetrahydroabietic acid in the polymeric material. An amount of hydroxytetrahydroabietic acid up to about 10 per cent is particularly advantageous.

Since hydroxytetrahydroabietic acid neutralizes itself by lactonization either on heating or on standing, it is understood that the hydroxytetrahydroabietic acid in the polymer may be present as the free acid or in the form of its lactone.

One means of incorporating small amounts of hydroxytetrahydroabietic acid or its lactone in a rubbery polymer is through the use of alkali metal salts of these acids as emulsifying agents in the preparation of the polymer as shown in the foregoing examples. By carrying out the polymerization in an aqueous emulsion in the presence of these soaps the addition of acid and salt in the precipitation of the polymer precipitates the free hydroxytetrahydroabietic acid in the polymer. The polymer may then be washed until from about 0 to about 5 per cent of hydroxytetrahydroabietic acid remains in the polymer. This has the advantage of eliminating the necessity for washing the polymer completely free of the emulsifying agent, as has to be done in the case of fatty acid soaps, and at the same time permits a means of simply and uniformly incorporating a small amount of hydroxytetrahydroabietic acid or its lactone in the polymerized material. In fact, an additional amount of hydroxytetrahydroabietic acid may be added to the polymer to provide an amount of up to about 10 per cent by weight of polymer, in order to take advantage of the improvements made by the presence of hydroxytetrahydroabietic acid or its lactone in the finished product.

The rubber-like polymers formed by emulsion polymerization of butadiene and styrene in the presence of hydroxytetrahydroabietic acid soap and containing, as a result thereof, an amount of hydroxytetrahydroabietic acid or its lactone up to about 10 per cent, exhibit exceptionally high tensile strengths and elongations when compounded and vulcanized. The tack, building properties, and mill behavior in the unvulcanized state are also noticeably improved. The hydroxytetrahydroabietic acid may, if desired, be washed completely out of the polymer, and the resulting polymer will still have an improved millability over that of a polymer prepared with a fatty acid soap.

The alkali metal salts of hydroxytetrahydroabietic acid may be used alone or combined with fatty acid soaps as the emulsifying agent in polymerization by the emulsion technique. One of the advantages in using such a mixed emulsifying agent is that certain of the less expensive fatty acid soaps, which are themselves unsatisfactory for emulsion polymerizations, may be used when used in combination with a soap of hydroxytetrahydroabietic acid.

Compounds which may be advantageously polymerized in aqueous emulsion by means of the soaps of hydroxytetrahydroabietic acid include butadiene and its derivatives such as isoprene, dimethylbutadiene, chloroprene, etc., or other compounds containing the vinyl group such as styrene, methacrylic esters, etc. The alkali metal salts of hydroxytetrahydroabietic acid have been found to be excellent emulsifying agents particularly in the preparation of the copolymers of butadiene and styrene or acrylonitrile, isoprene and styrene or acrylonitrile, and other rubber-like copolymers, as well as in the preparation of polymers such as polyvinyl chloride, polyvinyl acetate, polystyrene, polymethyl methacrylate, and the various other addition polymers which may be prepared by the emulsion technique.

The polymerizations in which hydroxytetrahydroabietic acid soaps are used may be subjected to the same variations in reaction conditions, for example, concentration of reactants, temperature, pressure, etc., as those in which a fatty acid soap is used. The temperature of the reaction may vary from about 20° to about 100° C., preferably from about 40° to about 60° C., and the concentration of the emulsifying agent may be varied from about 1 to about 5 per cent, usually about 2 to about 3 per cent is sufficient. The polymerization, in general, is carried out with the aid of a catalyst, such as a peroxide-type catalyst, potassium persulfate, etc. Hydroxytetrahydroabietic acid soaps may also be used in combination with any desired initiator or other polymerization or processing aid.

What I claim and desire to protect by Letters Patent is:

1. The process which comprises polymerizing in aqueous emulsion a conjugated butadiene hydrocarbon in the presence of an alkali metal salt of hydroxytetrahydroabietic acid.

2. The process which comprises copolymerizing in aqueous emulsion a mixture of a conjugated butadiene hydrocarbon and another organic compound containing the group $CH_2=C<$ and which is capable of being polymerized by a peroxide catalyst, in the presence of an alkali metal salt of hydroxytetrahydroabietic acid.

3. The process which comprises copolymerizing in aqueous emulsion a mixture of butadiene-1,3 and styrene in the presence of an alkali metal salt of hydroxytetrahydroabietic acid.

4. The process which comprises copolymerizing in aqueous emulsion a mixture of butadiene-1,3 and acrylonitrile in the presence of an alkali metal salt of hydroxytetrahydroabietic acid.

5. The process which comprises polymerizing in aqueous emulsion a conjugated butadiene hydrocarbon in the presence of sodium hydroxytetrahydroabietate.

6. The process which comprises copolymerizing in aqueous emulsion a mixture of butadiene-1,3 and styrene in the presence of sodium hydroxytetrahydroabietate.

7. The process which comprises copolymerizing in aqueous emulsion a mixture of butadiene-1,3 and acrylonitrile in the presence of sodium hydroxytetrahydroabietate.

JOSEPH N. BORGLIN.

REFERENCES CITED

The following references are of record in the file of this patent:

UNITED STATES PATENTS

| Number | Name | Date |
|---|---|---|
| 2,129,478 | Rohm | Sept. 6, 1938 |
| 2,142,039 | Abrams | Dec. 27, 1938 |
| 2,216,958 | Pannwitz | Oct. 8, 1940 |
| 2,225,246 | Hasselstrom | Dec. 17, 1940 |
| 2,264,173 | Collins | Nov. 25, 1941 |
| 2,295,030 | Dales | Sept. 8, 1942 |

OTHER REFERENCES

Hasselstrom: Journ. Amer. Chem. Soc., vol. 60, 1938, p. 1267.

Carlton et al: The Rubber Age, vol. 52, No. 1, October 1942, pages 29 and 33.

Hercules: "Naval Stores and the Compounding of Synthetic Rubber," Sept. 18, 1943, pages 6 and 7.

Starkweather et al., Ind. and Eng. Chem., vol. 39, No. 2, 1947, pp. 210 and 211.